United States Patent [19]
Sakoda et al.

[11] Patent Number: 6,070,056
[45] Date of Patent: May 30, 2000

[54] AMPLITUDE-PHASE CORRECTION CIRCUIT, RECEIVING DEVICE AND TRANSMITTING DEVICE

[75] Inventors: Kazuyuki Sakoda; Mitsuhiro Suzuki, both of Chiba, Japan

[73] Assignee: Sony Corporation, Tokyo, Japan

[21] Appl. No.: 08/910,661

[22] Filed: Aug. 13, 1997

[30] Foreign Application Priority Data

Aug. 23, 1996 [JP] Japan ................................. P08-222934

[51] Int. Cl.$^7$ ..................................................... H04Q 17/00
[52] U.S. Cl. ........................ 455/67.1; 455/102; 455/116; 455/115
[58] Field of Search ..................................... 375/346, 285, 375/316, 296, 260, 295; 455/102, 103, 113, 115, 116, 125, 67.1

[56] References Cited

U.S. PATENT DOCUMENTS

| | | | |
|---|---|---|---|
| 3,845,390 | 10/1974 | De Jager et al. ........................ | 375/231 |
| 4,943,980 | 7/1990 | Dobson et al. ........................ | 375/269 |
| 5,128,964 | 7/1992 | Mallory ................................... | 375/261 |
| 5,444,697 | 8/1995 | Leung et al. ............................ | 370/207 |
| 5,541,552 | 7/1996 | Suzuki et al. ........................... | 329/307 |
| 5,896,420 | 4/1999 | Kaku et al. ............................. | 375/285 |

*Primary Examiner*—Daniel S. Hunter
*Assistant Examiner*—Yemane Woldetatios
*Attorney, Agent, or Firm*—Jay H. Maioli

[57] ABSTRACT

A phase deviation can be prevented at the time of processing carried out when a multi-carrier signal is transmitted. A multi-carrier signal is filtered in a filter (103), and thereafter subjected to fast Fourier transform to produce symbol sequence data. The amplitude and phase of a signal obtained as the symbol sequence data are corrected. As its amplitude-phase correction circuit (211), a correction value storing portion for storing a value to cancel a change amount of the signal caused by an amplitude characteristic and a phase characteristic of the filtering in its pass band, and a multiplier for multiplying an output value of the fast Fourier transform by a value stored in the correction value storing portion are provided.

14 Claims, 9 Drawing Sheets

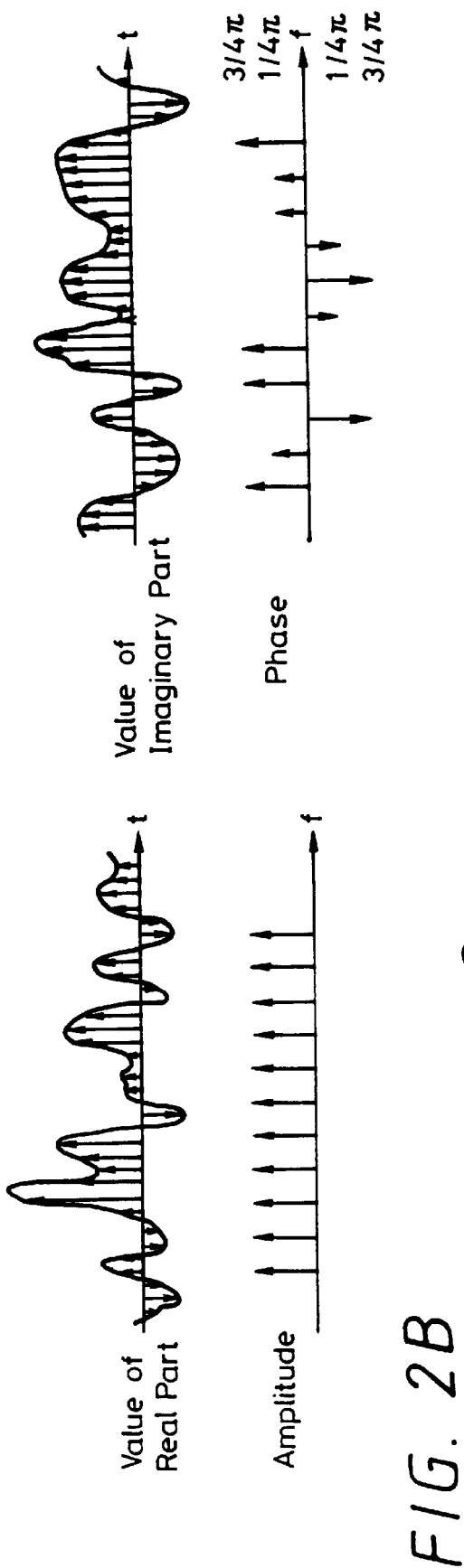
FIG. 2A
FIG. 2B

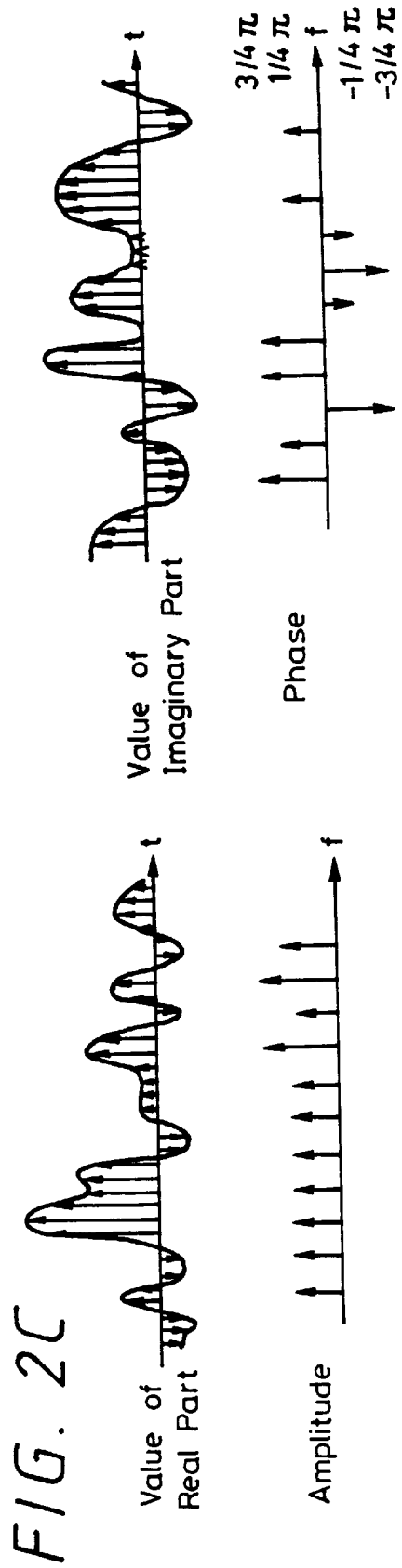
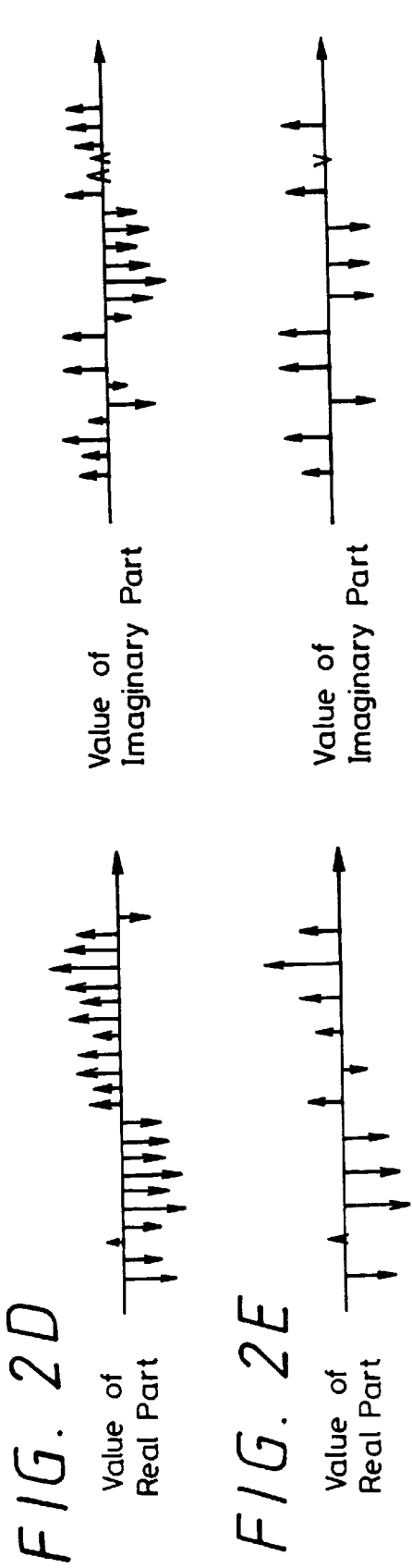

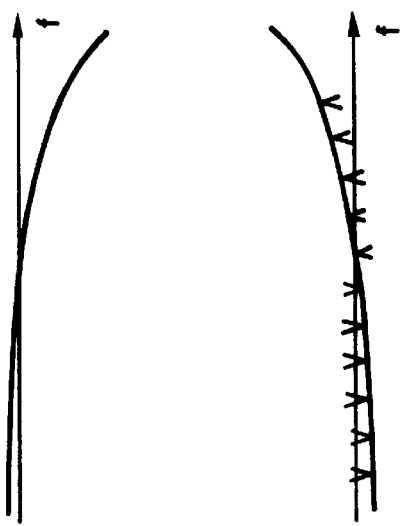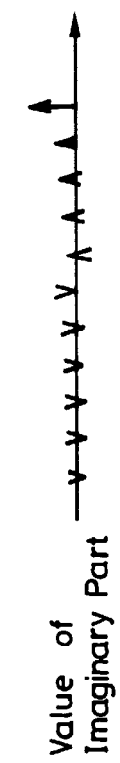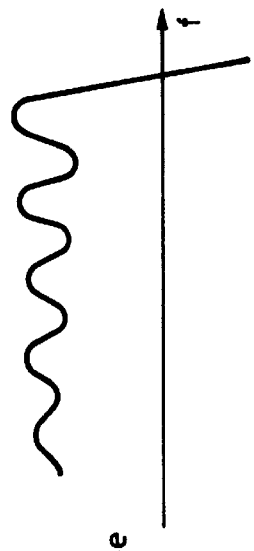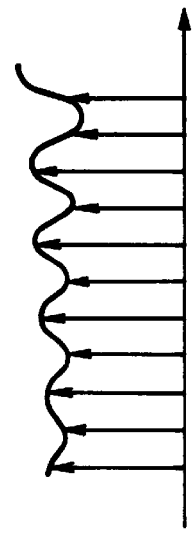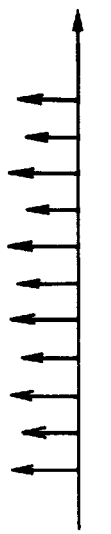
FIG. 6A
FIG. 6B
FIG. 6C

AMPLITUDE-PHASE CORRECTION CIRCUIT, RECEIVING DEVICE AND TRANSMITTING DEVICE

BACKGROUND OF THE INVENTION

1. Field of the Invention

The present invention relates to an amplitude-phase correction circuit suitable for modulation/demodulation processing in the case where communication using multi-carrier signals is conducted, and also relates to a receiving device and a transmitting device to which such a correction circuit is applied.

2. Description of the Related Art

There is a communication system using a signal called a multi-carrier signal. In this system, a plurality of carriers are simultaneously transmitted, and information is distributed to each of the carriers to conduct communication, so that an efficient transmission becomes possible. As one of transmission systems using such multi-carrier signal, the present applicant proposed a transmission system using a signal having a configuration referred to as an orthogonal frequency division multiplex (OFDM) wave (as in Japanese laid-open patent publication No. 8-132434, and so on). In this transmission system, a time slot is formed by taking a predetermined time as a unit. In addition, band slots divided on the frequency axis are prescribed in the time slot. Processing of simultaneously transmitting a plurality of carrier signals located at a bandslot interval by using a predetermined number of band slots is conducted at a predetermined time slot period.

FIG. 1 is a diagram showing an example of configuration of a conventional receiving circuit of this OFDM wave. A signal 106 fed from an antenna or an amplifier (neither of them is illustrated) undergoes frequency conversion in a down converter 102 to produce an intermediate frequency signal or a baseband signal. A frequency converted signal 107 is supplied to a low-pass filter 103, in which a carrier component and so on are removed to produce an OFDM wave 108 which is a multi-carrier signal. This OFDM wave 108 is a multi-carrier signal containing a signal in a certain carrier interval (i.e., the above described band slot interval).

The OFDM wave 108 is converted to a digital signal in an analog/digital converter 104. Converted data are supplied to a fast Fourier transform circuit (hereafter referred to as FFT) 105. In the analog/digital converter 104, oversampling twice the number of carriers is conducted. The FFT 105 conducts processing for converting an inputted signal 109 formed in a time sequence to a signal 110 on a frequency sequence. The signal 110 on the frequency sequence is selected by a signal selection circuit 101. Since oversampling of a doubled rate is now conducted in the analog/digital converter 104, processing of selecting information contained in half carriers of the output from of the FFT 105 is conducted. A selected signal 111 is used as a received symbol sequence.

The state of the signal received by the circuit of FIG. 1 is shown in FIGS. 2A to 2E. In FIGS. 2A to 2E, FIG. 2A shows waveforms of values of a real part and an imaginary part, the amplitude, and the phase of a signal which should be inputted to the FFT 105 in an ideal state. The QFDM wave is supposed to be subjected to a QPSK modulation. In this case, the amplitude of each of the carriers is equal to each other and four steps of phase (¾π, ¼π, −¼π, −¾π) are present irrespective of transmitted information. Phase values other than the four steps are not present.

In fact, however, dispersion occurs in the amplitude characteristics of the low-pass filter 103 in its pass band as shown in FIG. 2B. In addition, the phase rotates as shown in FIG. 2B. In general, the sharper the rising edges of the pass band and the cut-off band of a filter are set, the more significantly such changes of the amplitude and the phase occur in the pass band characteristic of a filter.

As a result, an actual signal inputted to the FFT circuit 105 after passing through the low-pass filter 103 becomes as shown in FIG. 2C, in which the amplitude is not constant and also as to the phase, phase values other than the four steps are present. If it is assumed that this signal is subjected to oversampling at a doubled rate in the analog/digital converter 104, it becomes as shown in FIG. 2D. As shown in FIG. 2E, the signal selected by the signal selection circuit 101 differs significantly from the ideal signal shown in FIG. 2A.

If there is such a signal change, transmitted information cannot be received accurately. Especially in the case where such communication as to transmit information by using phase differences among respective carries as a multi-carrier signal is conducted, the bad influence appears significantly.

In the receiving circuit, the amplitude and phase of a signal wave in the foregoing description are represented by handling the signal wave in the form of a real part component and an imaginary part component. Denoting the amplitude by r, the phase by θ, the real part component by re, and the imaginary part component by im, representation conversion conducted at that time becomes re=r cos θ, im=r sin θ.

SUMMARY OF THE INVENTION

In view of such aspects, it is an object of the present invention to prevent the phase shift at the time of processing in the case where a multi-carrier signal is transmitted.

According to a first aspect of the present invention, a correcting method for a device having a predetermined transmission characteristic includes a first analogue step for passing an analog signal through a first device having a predetermined transmission characteristic, an analog/digital converting step for converting an output signal of said first analog step to a digital signal, a first digital step for converting an output signal of said analog/digital converting step to a predetermined format signal, and a correcting step for correcting a characteristic of said first device by executing a predetermined calculation for an output digital signal of said first digital step.

According to a second aspect of the present invention, a signal processing apparatus with a device having a predetermined transmission characteristic includes a first portion supplied with an analog signal for processing a predetermined transmission characteristic, an analog/digital convertor for converting an output signal of said first portion to a digital signal, a first digital convertor for converting an output signal of said analog/digital convertor to a predetermined format signal, and a characteristic corrector for correcting a characteristic of said first device by executing a predetermined calculation for an output signal of said first digital convertor.

According to a third aspect of the present invention, a receiving apparatus for multi-carrier signal, includes a first portion supplied with a received multi-carrier signal for processing a predetermined transmission characteristic, an analog/digital convertor for converting an output signal of said first portion to a digital signal, a first digital convertor for converting an output signal of said analog/digital convertor to a predetermined format signal, and a characteristic corrector for correcting a characteristic of said first device by executing a predetermined calculation for an output signal of said first digital convertor.

According to a fourth aspect of the present invention, a transmitting apparatus for a multi-carrier signal, includes a characteristic corrector for correcting a characteristic of a first device by executing a predetermined calculation, a first digital convertor for converting an output signal of said characteristic corrector to a predetermined format signal, a digital/analog convertor for converting an output signal of said first digital convertor to an analog signal, and a first portion supplied with an output analog signal from said digital/analog convertor for processing a predetermined transmission characteristic and generating a multi-carrier signal.

BRIEF DESCRIPTION OF THE DRAWINGS

FIGS. 2A to 2E are diagrams showing waveforms obtained by an example of a processing carried out by the above receiving circuit shown in FIG. 1;

FIGS. 6A to 6E are waveform diagram used to explain an amplitude-phase correction processing state according to the embodiment.

DESCRIPTION OF THE PREFERRED EMBODIMENTS

Figure 1:
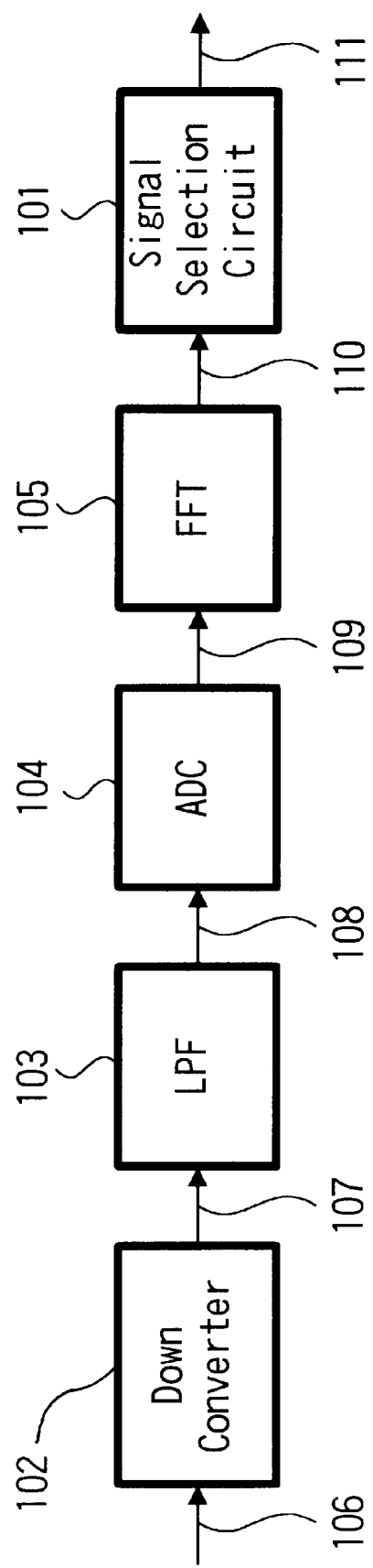
FIG. 1 is a block diagram showing an example of a conventional receiving circuit configuration.

Hereafter, an embodiment of the present invention will be described with reference to FIGS. 3 through 6. In FIGS. 3 through 6, components corresponding to FIGS. 1 and 2A to 2E described as an example of the conventional technique are denoted by like reference numerals and detailed description thereof will be omitted.

Figure 3:
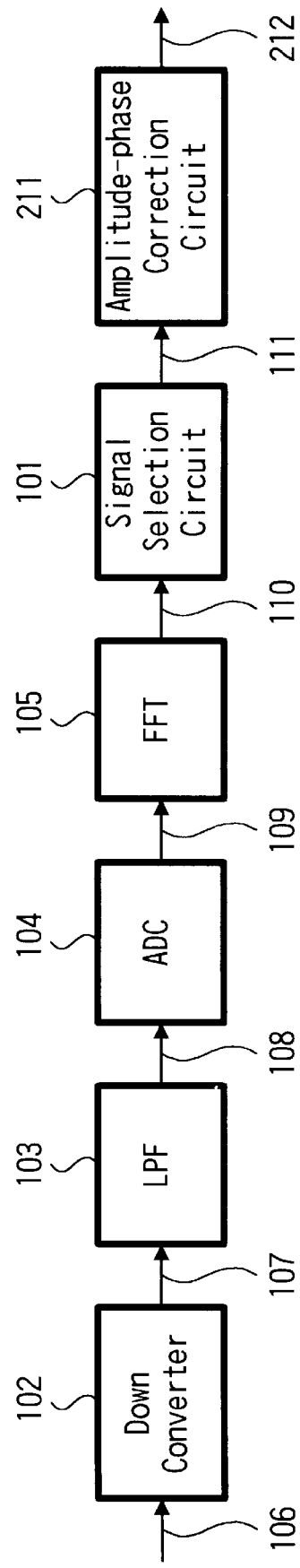
FIG. 3 is a block diagram showing a receiving circuit configuration according to an embodiment of the present invention.

FIG. 3 is a diagram showing the configuration of a receiving circuit of the present example. A signal 106 fed from an antenna or an amplifier undergoes frequency conversion in a down converter 102 to produce an intermediate frequency signal or a baseband signal. A frequency converted signal 107 therefrom is supplied to a low-pass filter 103. In the low-pass filter, carrier components and so on are removed to produce an OFDM wave 108 which is a multi-carrier signal. This OFDM wave 108 is a multi-carrier signal containing signals in a certain carrier interval (i.e., the above described band slot interval).

The OFDM wave 108 is converted to a digital signal in an analog/digital converter 104. Converted data are supplied to an FFT circuit 105. In the analog/digital converter 104, oversampling twice the number of carriers is conducted. The FFT 105 conducts processing for converting an inputted signal 109 formed in a time sequence to a signal 110 on a frequency sequence. The signal 110 on the frequency sequence is selected by a signal selection circuit 101 to produce a selected signal 111. In the signal selection circuit, processing of selecting information contained in half carriers of the output of the FFT 105 is conducted. The configuration so far is the same as that of the conventional receiving circuit shown in FIG. 1.

In the present example, the signal 111 outputted by the signal selection circuit 101 is supplied to an amplitude-phase correction circuit 201 to produce a signal 212 corrected in amplitude and phase. The signal 212 outputted by the amplitude-phase correction circuit 201 is used as a received symbol.

Figure 4:
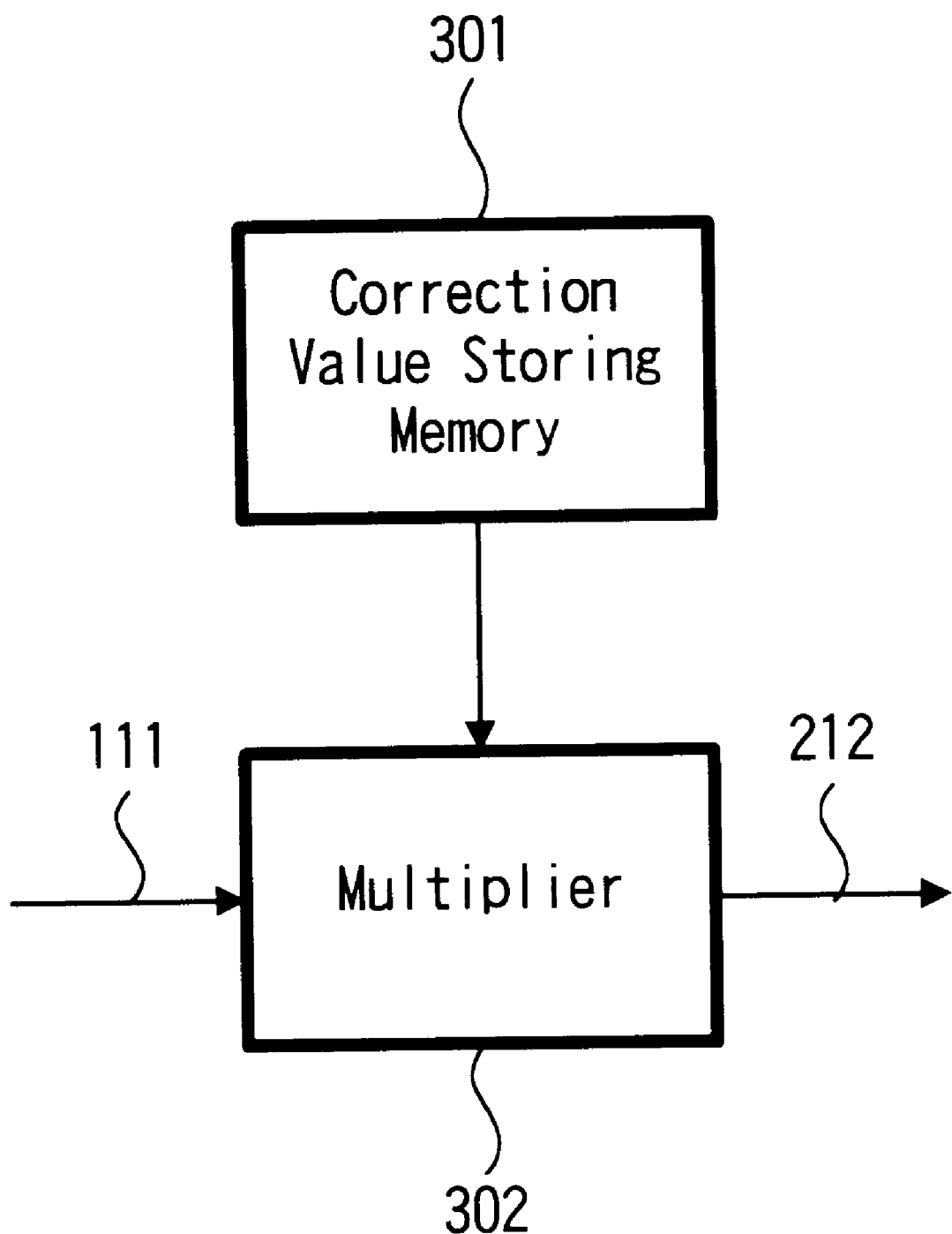
FIG. 4 is a block diagram showing an amplitude-phase correction circuit of the embodiment.

The configuration of the amplitude-phase correction circuit 201 is shown in FIG. 4. The amplitude-phase correction circuit 201 is formed by a correction value storing memory 301 and a multiplier 302. The correction value storing memory 301 stores a value calculated beforehand from the amplitude characteristics and the phase characteristics of the low-pass filter 103 so as to cancel those characteristics at carrier frequencies containing the information. Each symbol which is the signal 111 outputted by the signal selection circuit 101 is supplied to the multiplier 302 and is multiplied by the amplitude-phase correction value stored in the correction value storing memory 301. By the processing in the amplitude-phase correction circuit 201, a symbol sequence which should be ideally outputted by the FFT 105 is outputted.

As for the correction value stored in the correction value storing memory 301, a suitable correction value is stored for each frequency position of each carrier. At timing producing a signal obtained by converting a carrier in a corresponding frequency position, a corresponding correction value is read out from the memory 301 and the signal is multiplied by the correction value. In this case, each of the input signal, the output signal, and the correction value to the multiplier 302 is a signal of a complex number having a real part component and an imaginary part component. As the multiplication, multiplication of complex numbers is conducted.

Figures 5A, 5B, 5C:
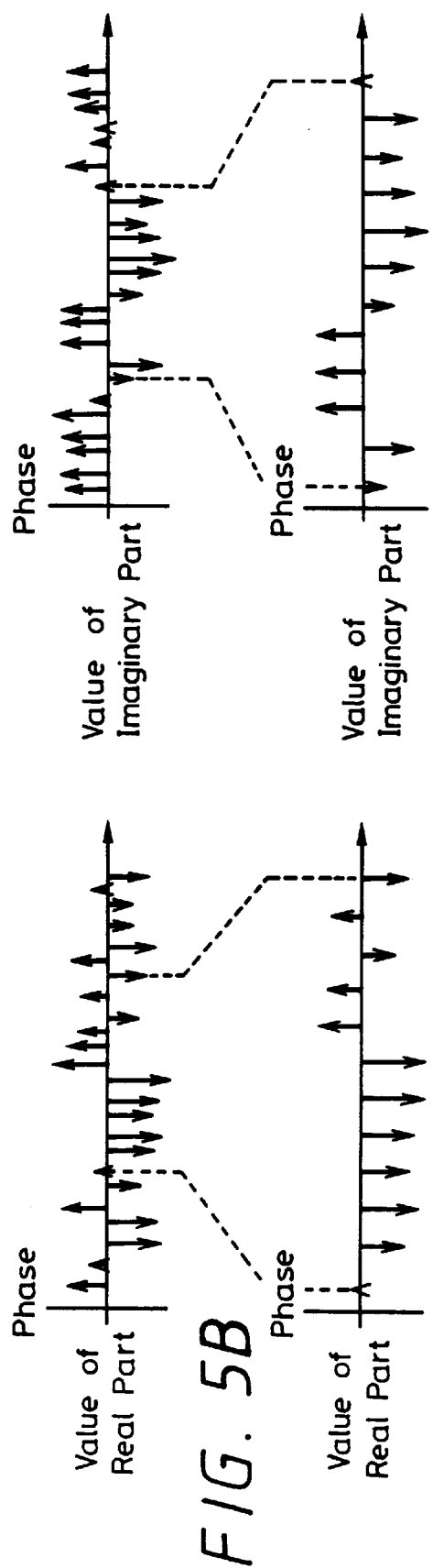
FIGS. 5A to 5C are diagrams showing waveforms of received signals according to the embodiment.

FIGS. 5A to 5C are diagrams showing a processing conducted by the circuit of the embodiment. It is now assumed that a symbol sequence oversampled with a doubled rate as shown in FIG. 5A is outputted from the FFT 105 as the signal 110. The signal 111 selected by the signal selection circuit 101 becomes a signal thinned to ½ (only the sample points at the center are extracted as shown in FIG. 5B). As the signal resulting from the multiplication by the correction values conducted in the amplitude-phase correction circuit 201, there is obtained an ideal symbol sequence having a constant amplitude and a phase of only a predetermined finite value at each frequency as shown in FIG. 5C.

Figure 6D:
Figure 6E:

Processing for calculating the correction values to be stored in the correction value storing memory 301 will now be described by referring to FIGS. 6A to 6E. First of all, it is now assumed that the amplitude-phase characteristics of the low-pass filter 103 are characteristics shown in FIG. 6A. Here, such characteristics as to cancel the amplitude characteristic and the phase characteristic of the low-pass filter 103 (i.e., as to make those characteristics flat) are derived. In FIG. 6B, there are shown characteristics canceling the amplitude characteristic and the phase characteristic of the low-pass filter 103 corresponding to the characteristics of FIG. 6A. It is sufficient for the amplitude-phase correction circuit 211 needs to have the characteristics shown in FIG. 6B. The actual symbol sequence is formed by a real part component and an imaginary part component. As shown in FIG. 6C, therefore, the characteristics of FIG. 6B are represented by a real part component and an imaginary part component. Sampling values respectively of the real part component and the imaginary part in positions where carriers are present are stored in the memory 301. When a symbol sequence as shown in FIG. 6D is inputted to the amplitude-phase correction circuit 211, an ideal signal is thus obtained as corrected values as shown in FIG. 6E.

As heretofore described, the input signal of the amplitude-phase correction circuit connected after the FFT is multiplied by the values calculated beforehand so as to reflect the characteristics opposite to those of the low-pass filter. By doing so, the rotation of the phase and the dispersion of the amplitude in the pass band of the low-pass filter can be suppressed. Furthermore, as for the points extracted by the signal selection circuit 101, it needs only be linked to the oversampling conducted in the analog/digital converter 104. It is not limited to the above described ½ and 2 times, but ⅓ and 3 times, and ¼ and 4 times may also be used. Furthermore, instead of conducting oversampling in the analog/digital converter 104, corresponding processing may be conducted in the omitted circuit configuration of the signal selection circuit 101.

Figure 7:
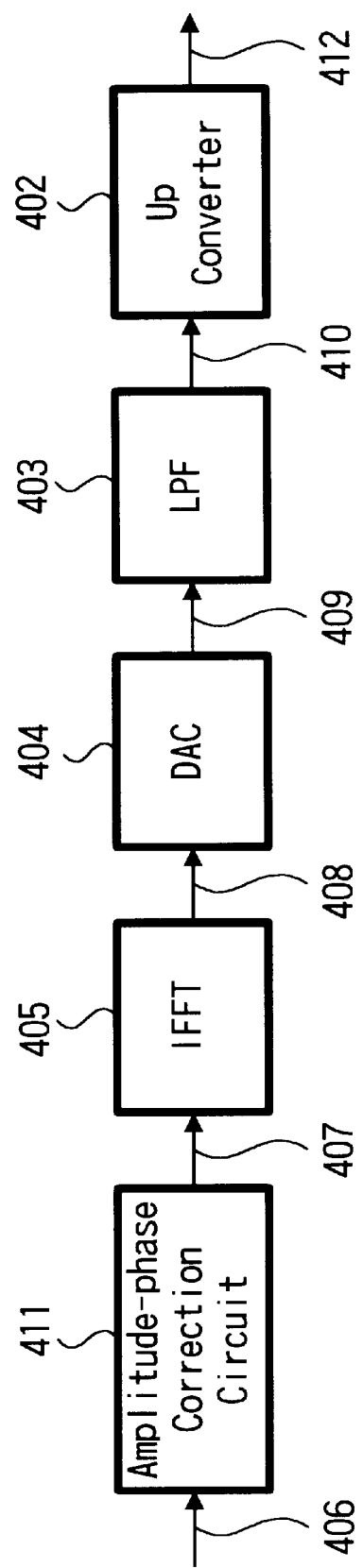
FIG. 7 is a block diagram showing a transmitting circuit configuration according to another embodiment of the present invention.

Another embodiment of the present invention will now be described by referring to FIG. 7. This example is an example of application to a transmitting circuit of the OFDM wave which is a multi-carrier signal. Its configuration will now be described. A transmitted symbol sequence 406 is converted to a signal 407 corrected in amplitude and phase by an amplitude-phase correction circuit 411. The signal 407 is supplied to an inverse fast Fourier transform circuit (IFFT) 405 for conversion to a multi-carrier signal. The signal 407 of a symbol sequence arranged on the frequency axis is thus converted to a multi-carrier signal 408 which is a discrete signal arranged on the time axis. This multi-carrier signal 408 is converted to a signal 409 by a digital/analog converter 404. The signal is then supplied to a low-pass filter 403. An output 410 of this low-pass filter 403 is supplied to an up converter 402 and modulated on a carrier wave to produce a transmission signal 412. The transmission signal 412 is radio-transmitted from an antenna (not illustrated).

Correction values of the amplitude and phase stored in the amplitude-phase correction value 411 are values for correcting the characteristics of the low-pass filter 403. By such a configuration, the output signal of the low-pass filter 403 becomes an OFDM wave obtained by ideally conducting transmission processing on the symbol sequence to be transmitted.

In each of the above described embodiments, the subjects of correction in the amplitude-phase correction circuit are pass band characteristics of the low-pass filter. The amplitude and phase of another circuit can also be corrected so long as its characteristics are known beforehand and its characteristics do not change.

According to the amplitude-phase correction circuit of the present invention, deviations caused in amplitude and phase at the time of filtering in a filter are corrected. Therefore, information contained in the multi-carrier signal which is a transmitted signal is transmitted accurately and hence favorable communication can be conducted.

By handling, especially as the multi-carrier signal in this case, a signal transmitting a phase difference between respective carriers as information, information using the phase difference is transmitted accurately. Favorable communication using the phase difference of a multi-carrier signal can be thus conducted.

According to the receiving device of the present invention, a received symbol corrected in deviations caused in amplitude and phase when a received signal is filtered by a filter is obtained. This results in an effect that information contained in a multi-carrier signal can be received accurately.

By receiving, especially as the received multi-carrier signal in this case, a signal transmitting a phase difference between respective carriers as information, information using the phase difference can be received accurately. Favorable communication using the phase difference of a multi-carrier signal can be thus conducted.

Furthermore, according to the transmitting device of the present invention, deviations caused in amplitude and phase when a signal to be transmitted is filtered by a filter are corrected beforehand. In information contained in a multi-carrier signal to be transmitted, therefore, there occurs no deviations in amplitude and phase caused by the influence of the filter. This results in a favorable signal scanning being transmitted.

By transmitting, especially as the multi-carrier signal to be transmitted in this case, a signal transmitting a phase difference between respective carriers as information, information using the phase difference can be transmitted accurately. Favorable communication using the phase difference of a multi-carrier signal can be thus conducted.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A signal processing apparatus for use with a device having a predetermined transmission characteristic, comprising;

analog means supplied with an analog signal for processing a predetermined transmission characteristic;

analog/digital converting means for converting an output signal of said analog means to a digital signal;

digital converting means for converting an output signal of said analog/digital converting means to a predetermined format signal; and characteristic correcting means for correcting a characteristic of said device by executing a predetermined calculation on said predetermined format signal of said digital converting means, wherein said characteristic correcting means comprises memorizing means for memorizing a correcting value and multiplying means for multiplying said correcting value to a signal to be corrected.

2. A signal processing apparatus for use with a device having a predetermined transmission characteristic, comprising:

characteristic correcting means for correcting a characteristic of said device by executing a predetermined calculation, wherein said characteristic correcting means comprises memorizing means for memorizing a correcting value and multiplying means for multiplying said correcting value to a signal to be corrected;

digital converting means for converting an output signal of said characteristic correcting means to a predetermined format signal;

digital/analog converting means for converting said predetermined format signal of said digital converting means to an analog signal; and analog means supplied with an output analog signal from said digital/analog converting means for processing a predetermined transmission characteristic.

3. A signal processing apparatus as claimed in claim 1, wherein said digital converting means executes a Fourier transform.

4. A signal processing apparatus as claimed in claim 2, wherein said digital converting means executes an inverse Fourier transform.

5. A receiving apparatus for a multi-carrier signal, comprising:

analog means supplied with a received multi-carrier signal for processing a predetermined transmission characteristic;

analog/digital converting means for converting an output signal of said analog means to a digital signal;

digital converting means for converting said digital signal of said analog/digital converting means to a predetermined format signal; and characteristic correcting means for correcting a characteristic by executing a predetermined calculation on said predetermined format signal of said digital converting means, wherein said characteristic correcting means comprises memorizing means for memorizing a correcting value and multiplying means for multiplying said correcting value to a signal to be corrected.

6. A receiving apparatus as claimed in claim 5, wherein said digital converting means executes a Fourier transform.

7. A receiving apparatus as claimed in claim 6, wherein said analog means is a low-pass filter.

8. A receiving apparatus as claimed in claim 7, wherein said multi-carrier signal is modulated with information by phase differences among sub-carrier.

9. A receiving apparatus as claimed in claim 5, wherein said correcting value includes a real part and an imaginary part, and said multiplying means executes a complex multiplication calculation.

10. A transmitting apparatus for a multi-carrier signal, comprising:

characteristic correction means for correcting a characteristic of a first device by executing a predetermined calculation, wherein said characteristic correcting means comprises memorizing means for memorizing a correcting value and multiplying means for multiplying said correcting value to a signal to be corrected;

digital converting means for converting an output signal of said characteristic correction means to a predetermined format signal;

a digital/analog converting means for converting said predetermined format signal of said digital converting means to an analog signal; and analog means supplied with an output analog signal from said digital/analog converting means for processing a predetermined transmission characteristic and generating the multi-carrier signal.

11. A transmitting apparatus as claimed in claim 10, wherein said digital converting means executes an inverse Fourier transform.

12. A transmitting apparatus as claimed in claim 11, wherein said analog means is a low-pass filter.

13. A transmitting apparatus as claimed in claim 12, wherein said multi-carrier signal is modulated information by phase differences among sub-carrier.

14. A transmitting apparatus as claimed in claim 10, wherein said correcting value includes a real part and an imaginary part, and said multiplying means executes a complex multiplication calculation.

* * * * *